(12) United States Patent
Farjoud et al.

(10) Patent No.: US 9,987,900 B2
(45) Date of Patent: Jun. 5, 2018

(54) ACTUATION MECHANISM FOR CONTROLLABLE DAMPER

(71) Applicant: BEIJINGWEST INDUSTRIES CO., LTD., Beijing (CN)

(72) Inventors: Alireza Farjoud, Kettering, OH (US); David John Barta, Kettering, OH (US); Michael W. Hurtt, Kettering, OH (US); Michael S. Rinn, Kettering, OH (US); Timothy Michael Schlangen, Kettering, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 0 days. days.

(21) Appl. No.: 15/038,503

(22) PCT Filed: Oct. 28, 2014

(86) PCT No.: PCT/CN2014/089653
§ 371 (c)(1),
(2) Date: May 23, 2016

(87) PCT Pub. No.: WO2015/078254
PCT Pub. Date: Jun. 4, 2015

(65) Prior Publication Data
US 2016/0297278 A1 Oct. 13, 2016

Related U.S. Application Data

(60) Provisional application No. 61/908,817, filed on Nov. 26, 2013.

(51) Int. Cl.
*B60G 17/08* (2006.01)
*F16F 9/49* (2006.01)
(Continued)

(52) U.S. Cl.
CPC ............. *B60G 17/08* (2013.01); *B60G 13/08* (2013.01); *F16F 9/19* (2013.01); *F16F 9/348* (2013.01);
(Continued)

(58) Field of Classification Search
CPC .... B60G 17/08; B60G 13/08; B60G 2202/24; B60G 2206/41; B60G 2500/11;
(Continued)

(56) References Cited

U.S. PATENT DOCUMENTS 5,054,809 A    10/1991  Yamaoka et al.
5,133,434 A *   7/1992  Kikushima ............. F16F 9/464
                                                             137/493.9
(Continued)

FOREIGN PATENT DOCUMENTS

CN         20127355 Y      7/2009
CN        102203369 A      9/2011
(Continued)

OTHER PUBLICATIONS

International Search Report, dated Jan. 30, 2015, 2 Pages.
(Continued)

*Primary Examiner* — Thomas J Williams
*Assistant Examiner* — Mariano Sy
(74) *Attorney, Agent, or Firm* — William H. Honaker; Dickinson Wright PLLC

(57) ABSTRACT

A fluid damper assembly for use in a vehicle includes a piston subassembly which includes a plurality of inflow passages and at least one rebound disk for restricting flow of hydraulic fluid through the inflow passages. A rod extends through the piston subassembly to actuate the piston subassembly between a rebound stroke and a compression stroke. An actuator supported by and within the rod includes a piezoelectric device and an amplifier for adjusting the damp-
(Continued)

ing force during the rebound stroke, thereby adjusting the suspension of the vehicle. A shaft within the rod is connected to a retainer to transmit motion from the amplifier to compress a spring and disengage the retainer from the rebound disk to allow the rebound disk to flex solely in response to hydraulic fluid pressure from the rebound stroke to open the inflow passages and reduce the damping force during the rebound stroke.

3 Claims, 8 Drawing Sheets

(51) Int. Cl.
*F16F 9/50* (2006.01)
*B60G 13/08* (2006.01)
*F16F 9/19* (2006.01)
*F16F 9/348* (2006.01)
*F16F 9/36* (2006.01)
*F16F 9/516* (2006.01)

(52) U.S. Cl.
CPC .............. *F16F 9/368* (2013.01); *F16F 9/49* (2013.01); *F16F 9/50* (2013.01); *F16F 9/5165* (2013.01); *B60G 2202/24* (2013.01); *B60G 2206/41* (2013.01); *B60G 2500/11* (2013.01)

(58) Field of Classification Search
CPC .... F16F 9/19; F16F 9/348; F16F 9/368; F16F 9/50; F16F 9/5165
USPC ...... 188/322.15, 322.18, 282.5, 282.8, 266.7
See application file for complete search history.

(56) References Cited

U.S. PATENT DOCUMENTS

| 5,507,371 | A | * | 4/1996 | Takahashi | F16F 9/446 188/282.5 |
| 5,833,037 | A | * | 11/1998 | Preukschat | F16F 9/512 188/299.1 |
| 6,161,662 | A | * | 12/2000 | Johnston | F16F 9/5123 188/282.3 |
| 8,132,654 | B2 | * | 3/2012 | Widla | F16F 9/3487 188/315 |
| 9,163,694 | B2 | * | 10/2015 | Goldasz | F16F 9/464 |
| 9,500,253 | B2 | * | 11/2016 | Goldasz | F16F 9/3485 |
| 2005/0051395 | A1 | * | 3/2005 | Deferme | F16F 9/348 188/282.5 |
| 2013/0001030 | A1 | | 1/2013 | Goldasz et al. | |
| 2013/0008750 | A1 | | 1/2013 | Piotrowski et al. | |

FOREIGN PATENT DOCUMENTS

| CN | 102465992 A | 5/2012 |
| JP | 1986013041 | 1/1986 |
| WO | 2013/086761 A1 | 6/2013 |

OTHER PUBLICATIONS

European Search Report dated Jun. 29, 2017, Six (6) Pages.
Japanese Office Action No. 2016-530199 dated Feb. 21, 2017, Three (3) Pages (includes English Translation, Three (3) Pages).

* cited by examiner

US 9,987,900 B2

ACTUATION MECHANISM FOR CONTROLLABLE DAMPER

TECHNICAL FIELD

The present invention relates generally to a fluid damper assembly for use in a vehicle.

BACKGROUND

Damper assemblies can be divided into two categories: friction dampers having solid elements and hydraulic dampers having fluid elements. Hydraulic dampers are used in the suspension system of a vehicle. Wherein, a piston subassembly moves in a fluid chamber in an upward movement, known as a rebound stroke, and a downward movement, known as a compression stroke. The rate of hydraulic fluid flow allowed through the piston subassembly determines the pressure drop and a damping force. A high damping force results in a stiff suspension and a low damping force results in a soft suspension. A stiff suspension results in a more active performance capability, whereas a soft suspension results in a more comfortable ride experience.

The main shortcoming of conventional damper assemblies is the compromise between stiff suspension and soft suspension. Wherein, stiff suspension includes high damping and active performance and soft suspension includes low damping and a more comfortable ride. Stiff suspension results in active handling, but negatively impacts noise and isolation. Soft suspension improves isolation, but adversely affects active handling.

The piston subassembly in a conventional fluid damper assembly includes a plurality of disks to control fluid flow through the piston subassembly by the force required to open a plurality of passages by flexing the disks. The disks and passages are designed and tuned for an optimum compromise between the stiff suspension and the soft suspension. The changing of damper tuning from a stiff suspension setting to a soft suspension setting requires disassembly of the fluid damper assembly and modifying the force necessary to flex the disks (i.e. stiffness of the disks).

In order to rapidly adjust between stiff suspension and soft suspension without disassembly, an actuator has been incorporated to adjust damping force on the disks from the passages to allow the disks to flex in response to hydraulic fluid pressure and open the passages, thus to adjust and soften the suspension.

Such a fluid damper assembly is disclosed in the U.S. Pat. No. 5,054,809 to Yamaoka et al. which comprises of a housing that has a wall extending annularly about and along a center axis to define a fluid chamber for containing a hydraulic fluid. A piston subassembly defines an upper surface and a lower surface defining a periphery extending axially therebetween and slidable along the wall of the housing between a rebound stroke and a compression stroke. A plurality of inflow passages allow the hydraulic fluid to flow through the piston subassembly during the rebound stroke and at least one rebound disk is disposed on the lower surface of the piston subassembly for restricting flow of the hydraulic fluid through the inflow passages. The rebound disk is seated on a retainer and a spring biases the retainer toward the rebound disk. A fastener abuts the spring for adjustably preloading the spring axially against the retainer to bias the retainer against the rebound disk. The rod includes a piezoelectric actuator for exerting an axial force directly on the rebound disk in directions opposite the biasing force of the spring to adjust between stiff suspension and soft suspension.

SUMMARY

The subject invention provides for such a fluid damper assembly for use in a vehicle including an actuator connected to the retainer for moving said retainer axially to compress the spring along the center axis for disengaging the retainer from the rebound disk to allow the rebound disk to flex solely in response to hydraulic fluid pressure from the rebound stroke to open the inflow passages of the piston subassembly and reduce the damping force during the rebound stroke.

The invention in its broadest aspect provides a fluid damper assembly that uses an actuator to allow for real-time fluid damper assembly controllability, and improved ride and handling performance. The invention's use of the actuator further allows for a reduction in complexity because the actuator's displacement capability eliminates the need for more than one damper, thereby minimizing overall damper size and cost. The invention also eliminates compromise between handling and isolation by allowing the fluid damper assembly to rapidly adjust between stiff suspension providing active performance and soft suspension providing for a more comfortable ride.

BRIEF DESCRIPTION OF DRAWINGS

Other advantages of the present invention will be readily appreciated, as the same becomes better understood by reference to the following detailed description when considered in connection with the accompanying drawings wherein.

DETAILED DESCRIPTION

A fluid damper assembly for use in a vehicle, constructed in accordance with the subject invention is shown in FIGS. 1 through 8.

Figure 1:
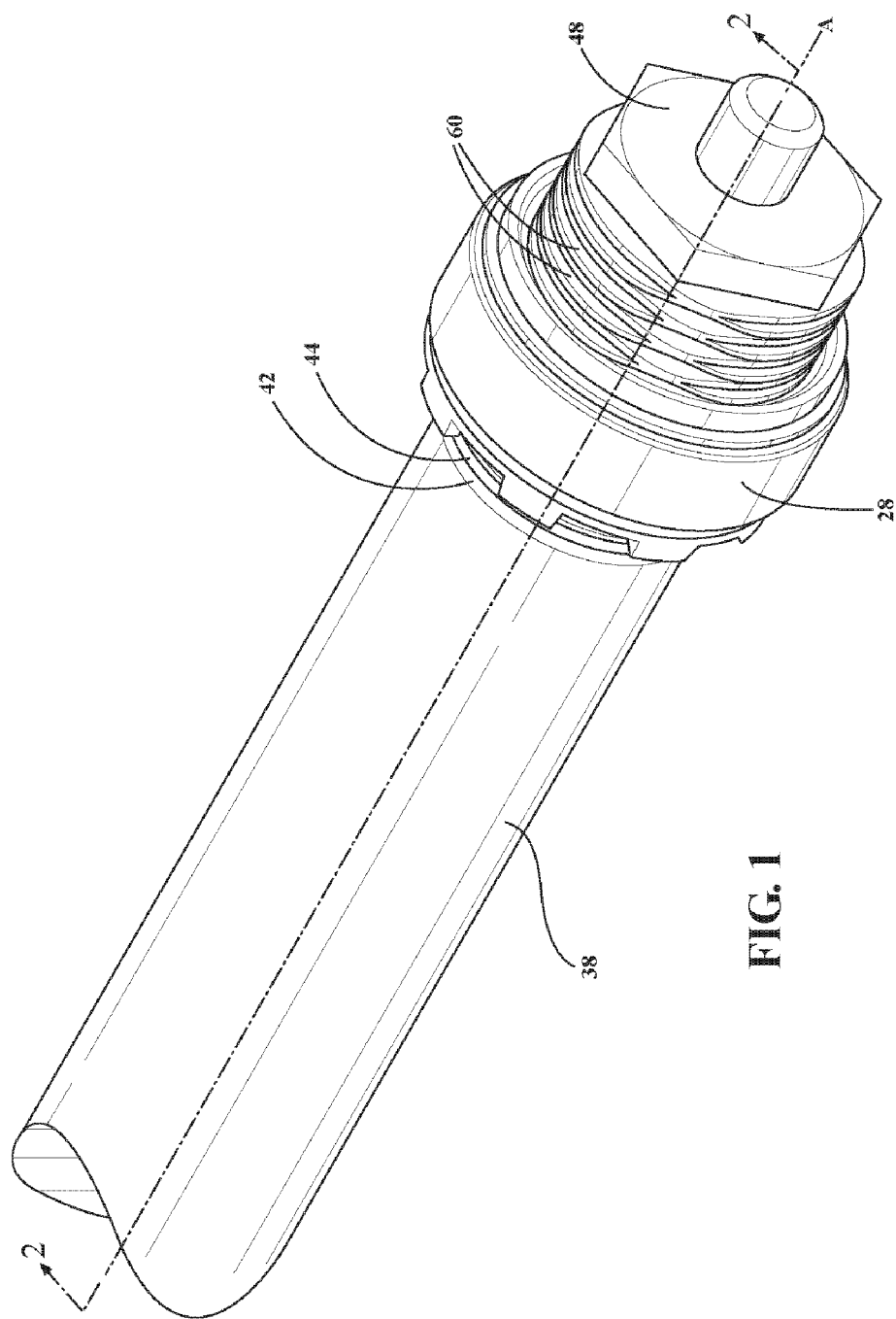
FIG. 1 is a perspective fragmentary view of an enabling embodiment of the fluid damper assembly.
Figure 2:
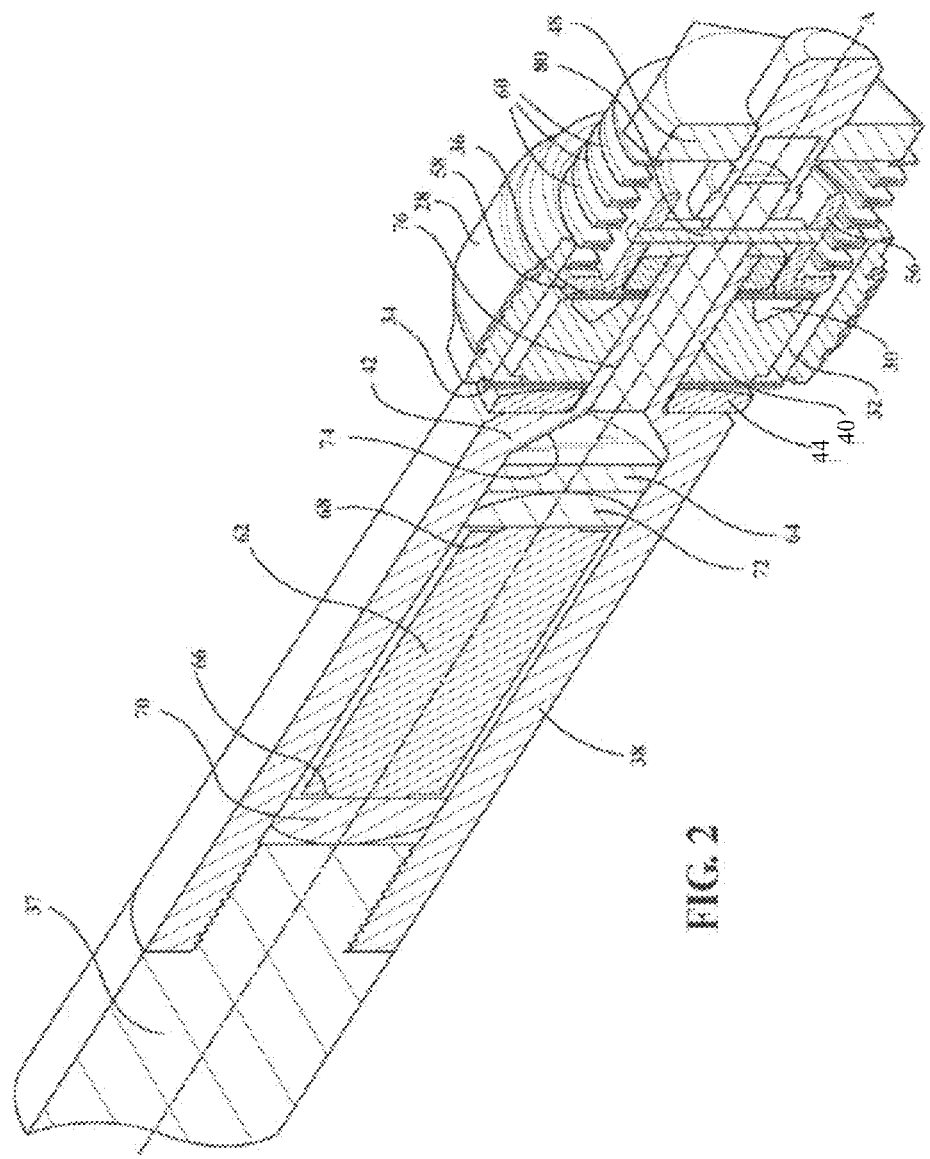
FIG. 2 is a perspective fragmentary cross-sectional view taken along the line 2-2 of FIG. 1.
Figure 3:
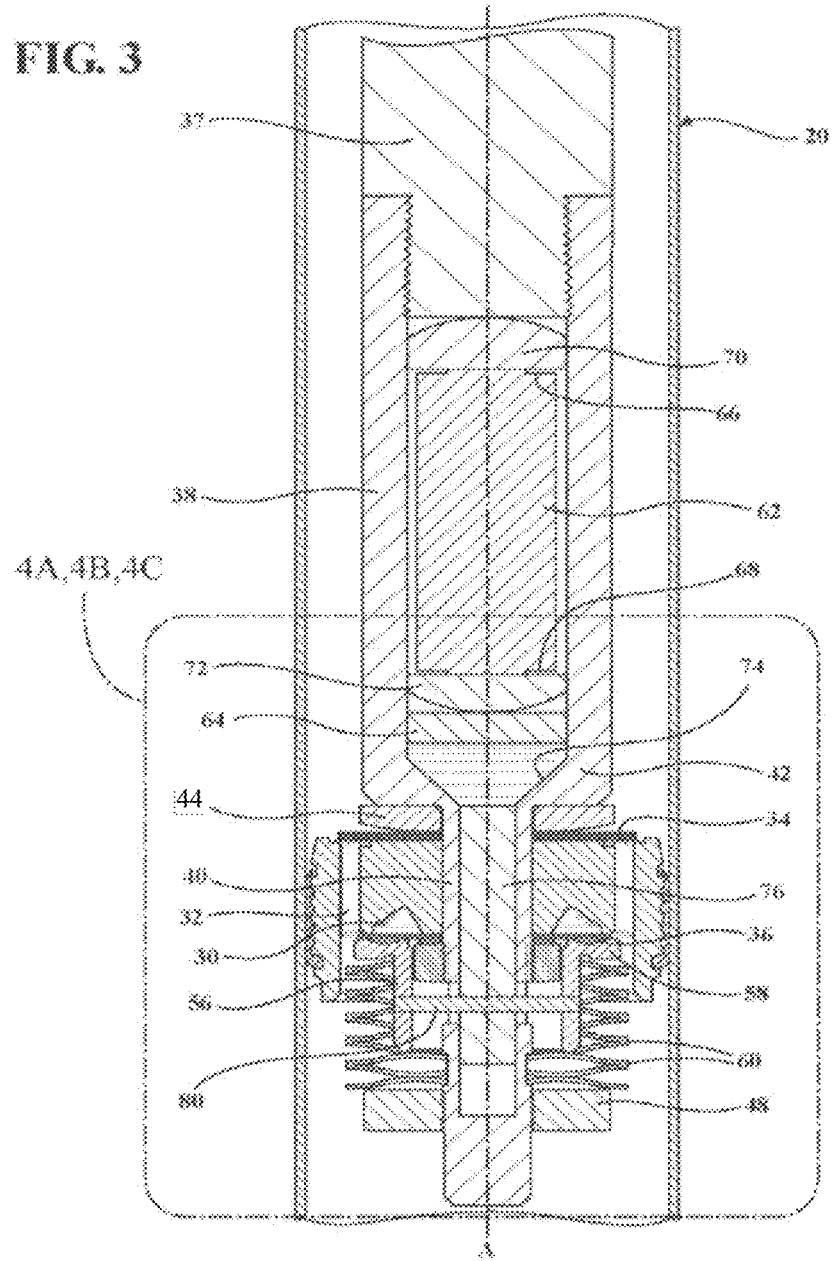
FIG. 3 is a vertical fragmentary cross-section view of the fluid damper assembly.

A housing 20, as generally indicated in FIG. 3, having a cap and a bottom defined by a wall of tubular shape extending annularly about and along a center axis A presents a fluid chamber extending between the cap and the bottom of the wall for containing a hydraulic fluid. The housing 20 is closed at the bottom for connecting the housing 20 to a lower mount of the vehicle. The fluid damper assembly, as generally shown in FIGS. 2 through 4C, is disposed in the fluid chamber of the housing 20 and extends through the cap of the housing 20 for connecting the fluid damper assembly to an upper mount of the vehicle, e.g., the suspension of the vehicle.

Figure 4A:
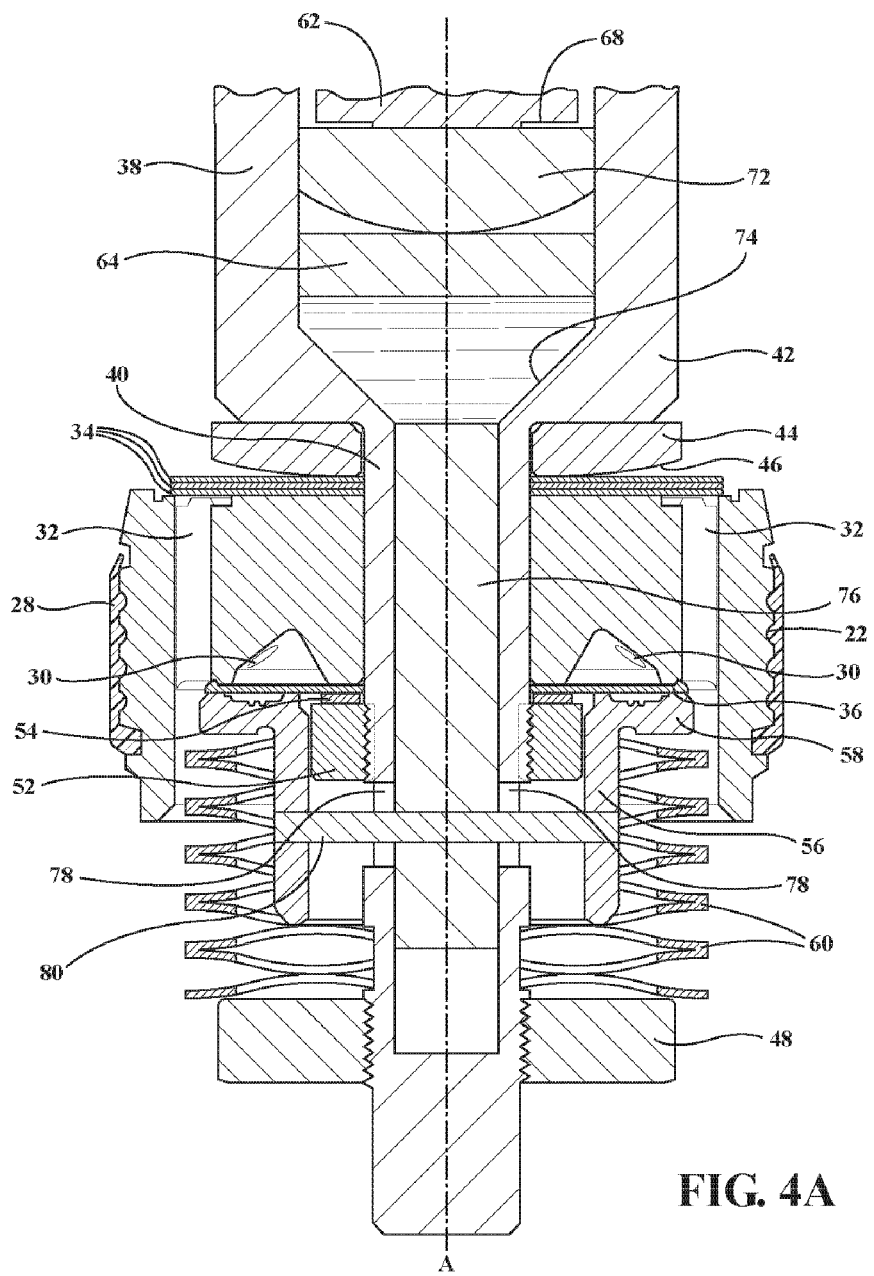
FIG. 4A is an enlarged fragmentary cross-sectional view taken within the circle labeled 4A of FIG. 3 and showing the fluid damper assembly during neutral operation.
Figure 4B:
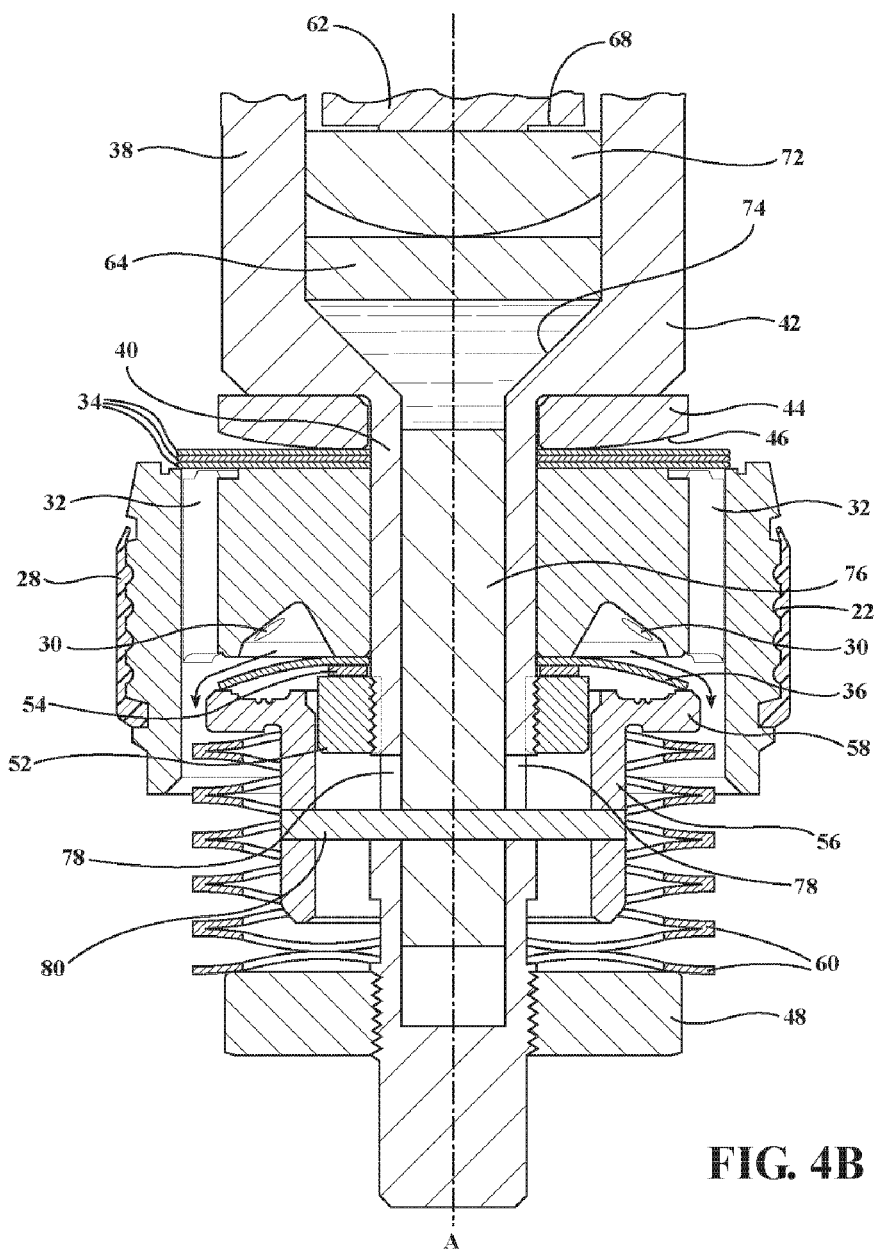
FIG. 4B is an enlarged fragmentary cross-sectional view like FIG. 4A, but showing the rebound stroke.
Figure 4C:
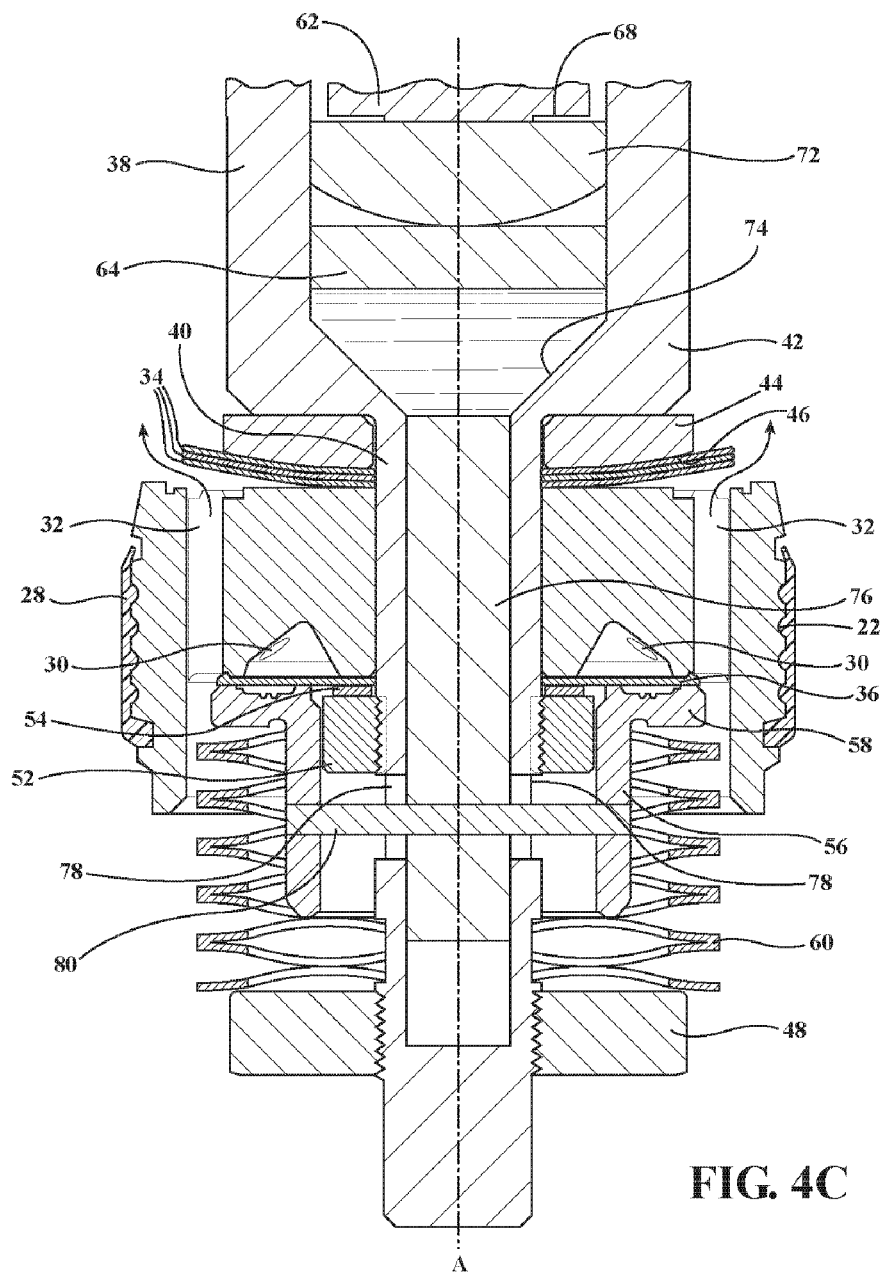
FIG. 4C is an enlarged fragmentary cross-sectional view like FIG. 4A, but showing the compression stroke.
Figure 5:
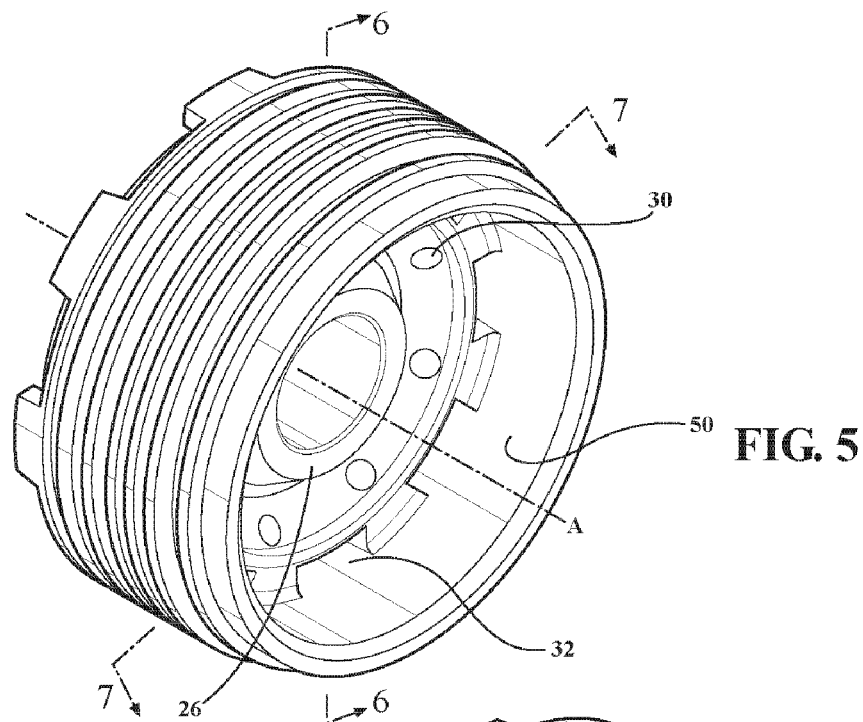
FIG. 5 is a perspective view of the piston subassembly.
Figure 6:
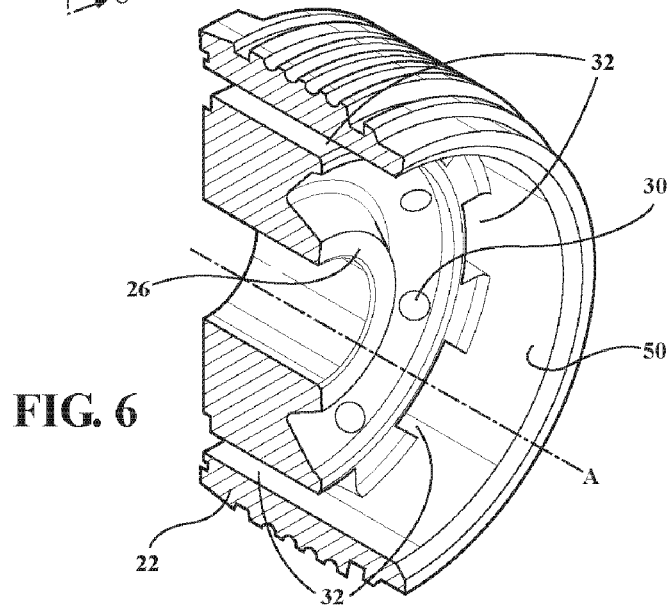
FIG. 6 is a perspective cross-sectional view taken along the line 6-6 of FIG. 5, to show the outflow passages.
Figure 7:
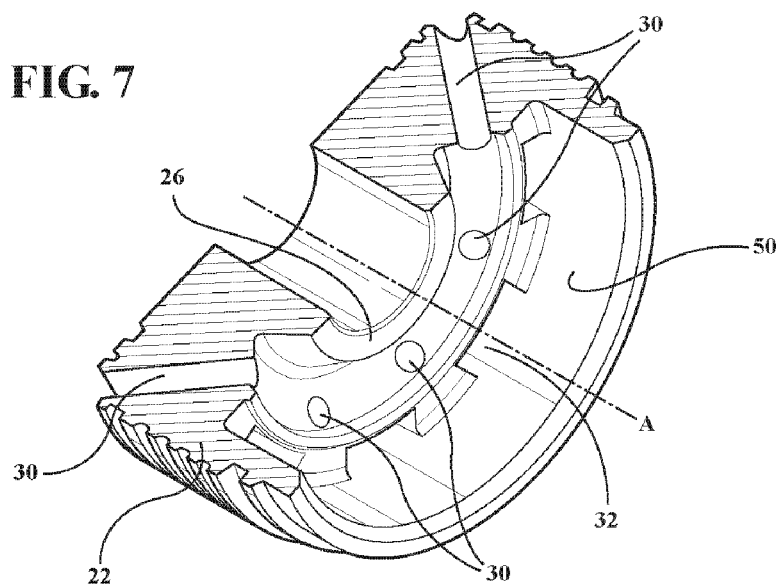
FIG. 7 is a perspective cross-sectional view taken along the line 7-7 of FIG. 5, to show the inflow passages.
Figure 8:
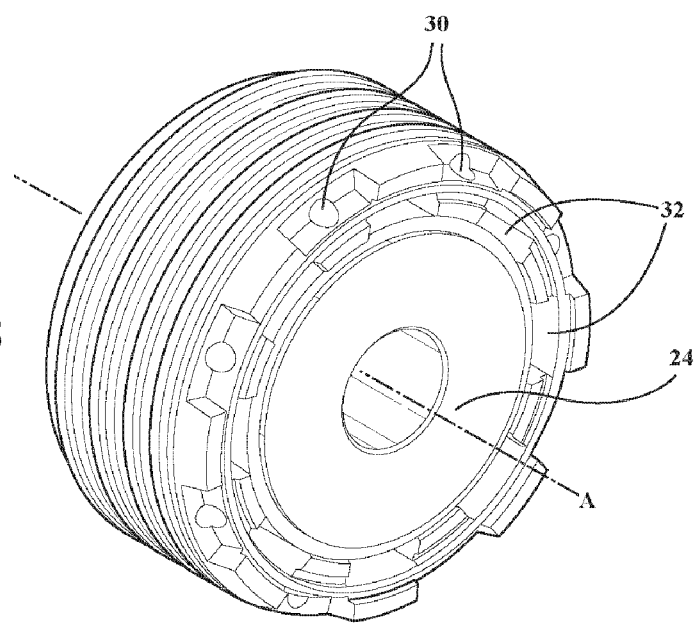
FIG. 8 is a perspective view of the upper surface of the piston subassembly.

A piston subassembly 22, 24, 26 is slidably disposed along and in sealing engagement with the wall of the housing 20 and extends radially from the center axis A to define a periphery 22 extending axially between and defining an upper surface 24 and a lower surface 26 for sliding and sealing engagement with the wall of the housing 20 between a rebound stroke, shown in FIG. 4B, and a compression stroke, shown in FIG. 4C. A seal 28 extends axially and concentrically about the piston subassembly 22, 24, 26 and is disposed between the wall of the housing 20 and the periphery 22 of the piston subassembly 22, 24, 26 for preventing hydraulic fluid from flowing therebetween. The seal 28 may be molded about annular grooves in the piston subassembly 22, 24, 26 to be locked into engagement with the piston subassembly 22, 24, 26. As best shown in FIG. 7, the piston subassembly 22, 24, 26 defines a plurality of inflow passages 30 that diverge relative to the center axis A from the lower surface 26 and extend radially outward to the upper surface 24 of the piston subassembly 22, 24, 26. The inflow passages 30 allow the hydraulic fluid to flow axially through the piston subassembly 22, 24, 26 during the rebound stroke, shown in FIG. 4B. As best shown in FIG. 6, the piston subassembly 22, 24, 26 further defines a plurality of outflow passages 32 that extend parallel to the center axis A between the upper surface 24 and the lower surface 26 of the piston subassembly 22, 24, 26. The outflow passages 32 allow the hydraulic fluid to flow axially through the piston subassembly 22, 24, 26 during the compression stroke, as shown in FIG. 4C. The inflow passages 30 extend radially inward and spaced apart from the outflow passages 32 towards the center axis A.

A plurality of disks 34, 36 includes a plurality of compression disks 34 and at least one rebound disk 36. The compression disks 34 are disposed concentrically with and abutting the upper surface 24 of the piston subassembly 22, 24, 26 for restricting flow of the hydraulic fluid through the outflow passages 32. The rebound disk 36 is disposed concentrically with and abutting the lower surface 26 of the piston subassembly 22, 24, 26 for restricting flow of the hydraulic fluid through the inflow passages 30. The piston subassembly 22, 24, 26 and the disks 34, 36 define a bore of cylindrical shape that extends along the center axis A between the upper surface 24 and the lower surface 26 of the piston subassembly 22, 24, 26 and through the disks 34, 36.

A rod 37, 38, 40 having a connection bar 37 is disposed in the housing 20 and extends along the center axis A through the housing 20 for mounting the fluid damper assembly to the upper mount of the vehicle. The rod 37, 38, 40 further has a large cross section 38 of cylindrical shape that threadedly engages the connection bar 37 and a small cross section 40 of cylindrical shape. The large cross section 38 and small cross section 40 of the rod 37, 38, 40 define a shoulder 42 that extends radially between the large cross section 38 and the small cross section 40. A top washer 44 is sandwiched between the shoulder 42 and the compression disks 34 for reacting between the shoulder 42 and the compression disks 34. The top washer 44 has a flat upper face that engages the shoulder 42 and a lower face 46 that curves away from engagement with the compression disks 34. The lower face 46 allows the compression disks 34 to flex in a gradually increasing distance or curve away from the upper surface 24 of the piston subassembly 22, 24, 26, as illustrated in FIG. 4C. The small cross section 40 of the rod 37, 38, 40 extends along the center axis A through the bore in the piston subassembly 22, 24, 26 to a terminal end for actuating the piston subassembly 22, 24, 26 between the rebound stroke and the compression stroke. The small cross section 40 of the rod 37, 38, 40 presents a hollow portion of cylindrical shape that is disposed in the small cross section 40 on the center axis A and extends along the center axis A toward the terminal end of the small cross section 40 that threadedly supports a fastener 48.

The piston subassembly 22, 24, 26 further defines a recess 50 of cylindrical shape that is concentric with the center axis A and extends axially into the lower surface 26 of the piston subassembly 22, 24, 26. A clamp nut 52 of polygonal shape is disposed in the recess 50 of the piston subassembly 22, 24, 26 and is threadedly disposed on the small cross section 40 of the rod 37, 38, 40 to be concentric to the center axis A. The clamp nut 52 engages the rebound disk 36 against the lower surface 26 of the piston subassembly 22, 24, 26. The lower surface 26 of the piston subassembly 22, 24, 26 defines an annular cavity into which the inflow passages 30 terminate and the rebound disk 36 covers this annular cavity. A lower washer 54 is sandwiched between the rebound disk 36 and the clamp nut 52 for axially sandwiching the rebound disk 36 against the lower surface 26 of the piston subassembly 22, 24, 26 about the lower surface 26 of the piston subassembly 22, 24, 26 and radially inward from the annular cavity to allow the rebound disk 36 to flex in a gradually increasing distance or curve away from the lower surface 26 of the piston subassembly 22, 24, 26.

A retainer 56, 58 is disposed in the recess 50 of the piston subassembly 22, 24, 26 and includes a barrel 56 and a flange 58. The barrel 56 extends axially and is concentric about the clamp nut 52 and the flange 58 extends radially outward from the barrel 56 about the clamp nut 52 and the lower washer 54 for engaging the rebound disk 36 against the lower surface 26 of the piston subassembly 22, 24, 26. A spring 60 reacts with and is disposed annularly about the terminal end of the small cross section 40 of the rod 37, 38, 40 and extends between an active end engaging the flange 58 of the retainer 56, 58 and the fastener 48 at a reactive end of the rod 37, 38, 40 for biasing the flange 58 of the retainer 56, 58 toward and adjacent the rebound disk 36. The fastener 48 adjustably preloads the spring 60 axially against the flange 58 of the retainer 56, 58 to bias the flange 58 against the rebound disk 36.

An actuator 62, 64 is supported by and within the rod 37, 38, 40, and is connected to the retainer 56, 58 for moving the retainer 56, 58 axially and disengaging the flange 58 of the retainer 56, 58 from the rebound disk 36 to allow the rebound disk 36 to flex in response to hydraulic fluid pressure from the rebound stroke. The actuator 62, 64 includes a piezoelectric device 62, that is electrically operated by a controller, and an amplifier 64. The piezoelectric device 62 is disposed in the large cross section 38 of the rod 37, 38, 40 and extends between an upper end 66 and a lower end 68 for applying an axial force to the retainer 56, 58. An upper compression ring 70 is disposed between the upper end 66 of the piezoelectric device 62 and the connection bar 37 of the rod 37, 38, 40. A lower compression ring 72 abuts the lower end 68 of the piezoelectric device 62. The upper compression ring 70 and lower compression ring 72 bias the piezoelectric device 62 to a neutral position while allowing axial movement thereof. The amplifier 64 is disposed in the large cross section 38 of the rod 37, 38, 40 and that extends axially along the center axis A between the lower compression ring 72 and the shoulder 42 of the rod 37, 38, 40. The amplifier 64 augments the axial force of the piezoelectric device 62 to the retainer 56, 58. The actuator 62, 64 defines a compartment 74 that extends frustoconically inward along the center axis A between the amplifier 64 and the small cross section 40 of the rod 37, 38, 40 for containing hydraulic fluid to displace the axial force of the amplifier 64 to the retainer 56, 58. In the enabling embodiment, the amplifier 64 takes the form of an incompressible fluid. However, it should be appreciated that the amplifier 64 could alternatively have other forms, such as, but not limited to, a plunger or any hydraulic stroke amplifier. For example, a rubber cone of elastomeric material can be used as the amplifier 64.

A shaft 76 extends from the amplifier 64 of the actuator 62, 64 within the hollow portion of the small cross section 40 with slots 78 therein for receiving a pin 80. The shaft 76 extends from the amplifier 64 adjacent the shoulder 42 to a joint end that is adjacent the terminal end of the small cross section 40 to transmit motion axially from the amplifier 64 onto the retainer 56, 58. The terminal end of the small cross section 40 of the rod 37, 38, 40 presents the pair of slots 78 with each slot 78 being of an elongated rectangular shape along the center axis A. The pair of slots 78 extends axially along the small cross section 40 of the rod 37, 38, 40 and perpendicularly through the small cross section 40 of the rod 37, 38, 40. The pin 80 has a rectangular or circular cross section and extends through the shaft 76, the slots 78 in the rod 37, 38, 40, and between and fixed to opposite sides of the barrel 56 of the retainer 56, 58 to move the retainer 56, 58 axially. As a result, the pin 80 compresses the spring 60 axially along the center axis A to disengage the retainer 56, 58 from the rebound disk 36 to allow the rebound disk 36 to flex solely in response to hydraulic fluid pressure from the rebound stroke to open the inflow passages 30 of the piston subassembly 22, 24, 26 and reduce the damping force during the rebound stroke, as illustrated in FIG. 4B.

In operation, the actuator 62, 64 is electrically operated by the controller for supplying a voltage to the actuator 62, 64 to push the retainer 56, 58 downwards, thereby reducing the preload on the rebound disk 36. In response to the voltage supplied to the actuator 62, 64, the piezoelectric device 62 expands and extends along the center axis A to push the retainer 56, 58 along the center axis A. Accordingly, the rebound disk 36 will deflect at a lower damping force during the rebound stroke resulting in a softer suspension to provide isolation for a more comfortable ride, as shown in FIG. 4B. Otherwise, when the actuator 62, 64 is turned off, the rod 37, 38, 40 will not exert force on the retainer 56, 58, resulting in the highest level of damping force available and providing a stiff suspension during the rebound stroke. As shown in FIG. 4A, the fluid damper assembly is in a neutral operation where the actuator 62, 64 is turned off. As shown in FIG. 4C, the fluid damper assembly is operating in the compressions stroke where the actuator 62, 64 is turned off and the hydraulic fluid flows axially through the outflow passages 32 and flexes the compression disks 34 away from the outflow passages 32.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A fluid damper assembly for use in a vehicle comprising;
    a housing having a wall extending annularly about and along a center axis defining a fluid chamber for containing a hydraulic fluid,
    a piston subassembly extending radially from said center axis to define a periphery disposed in said fluid chamber and defining an upper surface and a lower surface with said periphery extending axially therebetween and slidable between a rebound stroke and a compression stroke,
    said piston subassembly defining a plurality of inflow passages for allowing the hydraulic fluid to flow through said piston subassembly during the rebound stroke,
    said piston subassembly further defining a plurality of outflow passages for allowing the hydraulic fluid to flow through said piston subassembly during the compression stroke,
    a plurality of disks including a plurality of compression disks and at least one rebound disk with said compression disks disposed on said upper surface of said piston subassembly for restricting flow of the hydraulic fluid through said outflow passages and said rebound disk disposed on said lower surface of said piston subassembly for restricting flow of the hydraulic fluid through said inflow passages,
    a rod extending along said center axis and through said piston subassembly to a terminal end for actuating said piston subassembly between the rebound stroke and the compression stroke,
    a retainer disposed on said rebound disk for engaging said rebound disk against said lower surface of said piston subassembly,
    a spring reacting with and disposed annularly about said terminal end of said rod for biasing said retainer toward said rebound disk,
    an actuator supported by and within said rod and connected to said retainer for moving said retainer axially to compress said spring along said center axis disengaging said retainer from said rebound disk to allow said rebound disk to flex solely in response to hydraulic fluid pressure from the rebound stroke to open said inflow passages of said piston subassembly and reduce the damping force during the rebound stroke,
    a shaft connected to said retainer for transmitting motion from said actuator onto said retainer,
    said terminal end of said rod presents a pair of slots extending axially along said rod and perpendicularly through said rod.

2. A fluid damper assembly as set forth in claim 1 including a pin extending through said shaft for axial movement therewith and through said slots in said rod and between and fixed to opposite sides of said retainer to move said retainer axially and compress said spring along said center axis for disengaging said retainer from said rebound disk to allow said rebound disk to open said inflow passages of said piston subassembly and reduce the damping force during the rebound stroke.

3. A fluid damper assembly for use in a vehicle comprising;

a housing having a wall of tubular shape extending annularly about and along a center axis defining a fluid chamber for containing a hydraulic fluid, a piston subassembly slidably disposed along and in sealing engagement with said wall of said housing and extending radially from said center axis to define a periphery extending axially between and defining an upper surface and a lower surface for sliding and sealing engagement with said wall of said housing between a rebound stroke and a compression stroke, a seal of organic polymeric material extending axially and concentrically about said piston subassembly and disposed between said wall of said housing and said periphery of said piston subassembly for preventing hydraulic fluid from flowing therebetween, said piston subassembly defining a plurality of inflow passages diverging relative to said center axis from said lower surface and extending radially outward to said upper surface of said piston subassembly for allowing the hydraulic fluid to flow axially through said piston subassembly during the rebound stroke, said piston subassembly further defining a plurality of outflow passages extending parallel to said center axis between said upper surface and said lower surface of said piston subassembly for allowing the hydraulic fluid to flow axially through said piston subassembly during the compression stroke, said inflow passages extending radially inward and spaced apart from said outflow passages towards said center axis, a plurality of disks including a plurality of compression disks and at least one rebound disk with said compression disks disposed concentrically with and abutting said upper surface of said piston subassembly for restricting flow of the hydraulic fluid through said outflow passages and said rebound disk disposed concentrically with and abutting said lower surface of said piston subassembly for restricting flow of the hydraulic fluid through said inflow passages, said piston subassembly and said disks defining a bore of cylindrical shape extending along said center axis between said upper surface and said lower surface of said piston subassembly, a rod having a connection bar disposed in said housing and extending along said center axis and outwardly through and from said housing for mounting the fluid damper assembly to the vehicle, said rod further having a large cross section of cylindrical shape threadedly engaging said connection bar and a small cross section of cylindrical shape to define a shoulder extending radially between said large cross section and said small cross section for actuating said piston subassembly between the rebound stroke and the compression stroke, a top washer sandwiched between said shoulder of said rod and said compression disks for reacting between said shoulder of said rod and said compression disks, said top washer having a flat upper face engaging said shoulder and a lower face curving away from engagement with said compression disks to allow said compression disks to flex away from said upper surface of said piston subassembly, said small cross section of said rod extending along said center axis and through said bore in said piston subassembly to a terminal end, said small cross section of said rod presenting a hollow portion of cylindrical shape disposed in said small cross section and on said center axis and extending along said center axis toward said terminal end of said small cross section, said piston subassembly further defining a recess of cylindrical shape concentric with said center axis and extending axially into said lower surface of said piston subassembly, a clamp nut of polygonal shape disposed in said recess of said piston subassembly and threadedly disposed on said small cross section of said rod and concentric to said center axis and engaging said rebound disk against said lower surface of said piston subassembly, a lower washer sandwiched between said rebound disk and said clamp nut for axially sandwiching said rebound disk against said lower surface of said piston subassembly to allow said rebound disk to flex in a gradually increasing distance or curve away from said lower surface of said piston subassembly, a retainer disposed in said recess of said piston subassembly and including a barrel extending axially and concentrically about said clamp nut and a flange extending radially outwardly from said barrel about said clamp nut and said lower washer for engaging said rebound disk against said lower surface of said piston subassembly, a spring reacting with and disposed annularly about said terminal end of said small cross section of said rod and extending between an active end engaging said flange of said retainer and a reactive end for biasing said flange of said retainer toward said rebound disk, a fastener of polygonal shape threadedly engaging said terminal end of said small cross section and abutting said reactive end of said spring and concentric to said center axis for adjustably preloading said spring axially against said flange of said retainer to bias said flange against said rebound disk, an actuator supported by and within said rod and connected to said retainer including a piezoelectric device electrically operated by a controller and disposed in said large cross section of said rod and extending between an upper end and a lower end for applying an axial force to said retainer, an upper compression ring disposed between said upper end of said piezoelectric device and said connection bar of said rod and a lower compression ring abutting said lower end of said piezoelectric device for biasing said piezoelectric device to a neutral position while allowing axial movement thereof, said actuator further including an amplifier disposed in said large cross section of said rod and extending axially along said center axis between said lower compression ring and said shoulder of said rod for augmenting the axial force of said piezoelectric device to said retainer, said actuator defining a compartment extending frusto-conically inward along said center axis between said amplifier and said small cross section of said rod for containing hydraulic fluid and displacing the axial force of said amplifier to said retainer, a shaft extending within said hollow portion of said small cross section from said amplifier adjacent said shoulder to a joint end adjacent said terminal end of said small cross section for transmitting motion axially from said amplifier onto said retainer, said terminal end of said small cross section of said rod presenting a pair of slots with each slot being of an elongated rectangular shape extending axially along said small cross section of said rod and perpendicularly through said small cross section of said rod, a pin having a rectangular cross section extending through said shaft for axial movement therewith and through said slots in said small cross section of said rod and between and fixed to opposite sides of said barrel of said retainer to move said retainer axially and compress said spring axially along said center axis for disengaging said flange of said retainer from said rebound disk to allow said rebound disk to flex solely in response to hydraulic fluid pressure from the rebound stroke to open said inflow passages of said piston subassembly and reduce the damping force during the rebound stroke.

* * * * *